United States Patent [19]
Osborne et al.

[11] Patent Number: 5,984,594
[45] Date of Patent: Nov. 16, 1999

[54] DRILL RIG AND METHOD OF USE FOR FORMING HOLES IN DRILL RESISTANT MATERIALS

[75] Inventors: Ernest M. Osborne; Michael J. Osborne, both of Lancaster, Ky.

[73] Assignee: Lockmasters, Inc., Nicholasville, Ky.

[21] Appl. No.: 09/087,781

[22] Filed: May 29, 1998

[51] Int. Cl.⁶ .............................. B23B 35/00; B23B 41/00
[52] U.S. Cl. ........................... 408/1 R; 408/76; 408/101; 408/111; 408/137
[58] Field of Search ................................ 408/1 R, 67, 76, 408/88, 92, 97, 100, 101, 111, 137, 138, 241 G, 234

[56] References Cited

U.S. PATENT DOCUMENTS

| | | | |
|---|---|---|---|
| 634,165 | 10/1899 | Croneau | 408/76 |
| 676,043 | 6/1901 | Lincoln | 408/76 |
| 3,068,725 | 12/1962 | Ver Nooy | 408/111 |
| 3,765,787 | 10/1973 | Hart et al. | 409/231 |
| 4,533,284 | 8/1985 | Agius et al. | 408/92 |
| 4,627,773 | 12/1986 | Ehnert | 409/215 |
| 4,662,201 | 5/1987 | Phillips | 70/465 |
| 4,865,493 | 9/1989 | Miller | 408/1 |
| 4,978,257 | 12/1990 | Nowman | 408/111 |
| 5,282,704 | 2/1994 | Screen | 408/138 |
| 5,462,392 | 10/1995 | Hardwick | 408/76 |

OTHER PUBLICATIONS

The National Safeman, *Alternatives to the Magnum 457*, Article, Summer 1993 (2 pgs.).
Lockmasters, *1990 Tool Catalog*, p. 30.
Lockmasters, *1997 Tool Catalog*, vol. 3, Catalog No. TC 9703, pp. 40–42.

*Primary Examiner*—Daniel W. Howell
*Attorney, Agent, or Firm*—Wood, Herron & Evans, L.L.P.

[57] ABSTRACT

A drill rig for drilling access holes in drill resistant materials, such as those used to construct safes or other secure containers. The drill rig includes a drill bit holding and advancing mechanism having enclosed threaded members for allowing incremental, even pressure to be applied during a drilling operation while preventing burrs and chips from becoming lodged within the threads. A sliding connection is provided between stationary frame structure of the rig and the drill bit holding and advancing mechanism. The connection includes a spring loaded, quick-release mechanism for allowing quick detachment of the drill bit holding and advancing mechanism from the frame structure at the end of a drilling operation or as needed to replace the drill bit.

32 Claims, 5 Drawing Sheets

DRILL RIG AND METHOD OF USE FOR FORMING HOLES IN DRILL RESISTANT MATERIALS

FIELD OF THE INVENTION

The present invention generally relates to drilling tools and methods and, more specifically, to apparatus and methods for drilling holes in hard or drill resistant materials.

BACKGROUND OF THE INVENTION

Many situations call for drills and associated drill rigs for forming holes in drill resistant materials. Such materials may include heavy gauge metals or alloys. Additional problems are presented when a drilling application requires a portable drill rig capable of applying large amounts of drill pressure.

As only one example, many safes and secure storage containers are constructed of strong, heavy gauge metal. One or more locks, such as combination locks, are provided to secure the contents from access by unauthorized personnel. In the absence of the safe owner or other authorized personnel, or in the event that the lock malfunctions or the key or combination is lost or forgotten, locksmiths must be called upon to open the safe or container. Often, this involves drilling one or more holes in a wall or door of the structure so that the inner workings of the lock may be viewed by the locksmith. This may be accomplished with an appropriate viewing device, such as a borescope. Holes may be required for other access methods as well. Although safes and high security storage containers may be opened by force, this is typically not desirable because of the resulting damage. When small holes are instead used, for example, to view the various tumbler wheels of a combination lock, the safe or storage container may be opened with very little damage and, therefore, may be repaired and reused in many cases.

Drill rigs exist for allowing holes of the above described type to be formed in a safe or locked storage container. Examples may be found in U.S. Pat. Nos. 4,662,201; 4,865,493; and 4,978,257, each assigned to the assignee of the present invention. Areas still in need of improvement generally relate to the mechanism used for incrementally advancing the drill bit and the mechanism used for completely withdrawing the drill bit and the attached drill bit holding and advancing mechanism or quill, such as for drill bit replacement purposes. In this latter regard, in some of the highest security safes and containers, which are formed from extremely highly drill resistant and/or heavy gauge metals, it is not uncommon to break or wear out several drill bits during the course of forming one hole.

The drill rig disclosed in U.S. Pat. No. 4,978,257 is especially suitable for high security containers. This drill rig uses fine pitched external threads on a drill bit holding and advancing mechanism in the form of a barrel assembly to apply and maintain fine increments of axial pressure without substantial effort or fatigue on the part of the user. Depth of penetration may also be viewed in small increments. One drawback, however, is that the drill bit holding and advancing mechanism is not easily inserted and withdrawn from the frame structure associated with the rig. Rather, the user must generally thread the entire mechanism out of the frame structure to replace a drill bit. Moreover, this drill rig and other similar drill rigs use exposed, external threads to apply axial drilling pressure. These threads are therefore susceptible to receiving stray metal burrs and chips thrown out from the drilled hole. The burrs and chips may then interfere with the engaging threads and make withdrawal, insertion and axial adjustment of the mechanism more difficult or impossible.

U.S. Pat. No. 4,865,493 discloses one type of sliding connection for mounting a drill bit holding and advancing mechanism within a frame structure. However, this patent discloses a rack and pinion or drill press-type mechanism for applying axial drilling pressure. While this type of mechanism is adequate in some lighter duty situations, in many situations the advantages of applying incremental and maintained drilling pressure through the use of a threaded mechanism is desirable or even necessary. Such lever rigs or drill press style rigs cannot maintain the constant pressure that threaded rigs can maintain without increased operator effort and fatigue. Depth of penetration is also more difficult to ascertain.

It would therefore be desirable to provide a drill rig that allows an operator to incrementally adjust and maintain drill pressure, while minimizing effort and fatigue, and while preventing metal chips and burrs from interfering with the threaded members associated with the guide and allowing quick and easy insertion and withdrawal of the drill bit holding and advancing mechanism.

SUMMARY OF THE INVENTION

The present invention provides a drill rig for drilling a hole in hard or drill resistant materials and achieves advantages and improvements generally related to problems in this area of technology. Generally defined, the drill rig includes a frame structure adapted to be attached adjacent to the hard or drill resistant material. A drill bit holding and advancing mechanism is mounted to the frame structure and has a rotatable spindle for holding a drill bit. In accordance with the first aspect of this invention, the drill bit holding and advancing mechanism further includes enclosed, cooperating threaded members operatively connected with the rotatable spindle. The enclosed, cooperating threaded members may be used to move the rotatable spindle in an axial direction and thereby apply incremental drill pressure to the hard or drill resistant material while minimizing effort and fatigue on the part of the operator. The threaded members are enclosed sufficiently to prevent chips and burrs produced during a drilling operation from lodging in the threads and interfering with the threading action. Thus, the cooperating threaded members may be rotated by the user to more smoothly advance and withdraw the drill bit during the drilling operation, while the independently rotatable spindle may be used to rotate the drill bit and form the hole.

In the specifically disclosed embodiment, the enclosed, cooperating threaded members include an internally threaded tube acting generally as a mounting member for connecting the drill bit holding and advancing mechanism to the frame structure, and an externally threaded member received within the internally threaded tube. A handle is connected to the externally threaded member for allowing rotation thereof by the user. The externally threaded member is connected for axial movement with the rotatable spindle, but also in a manner to allow relative rotation therebetween. Ideally, the externally threaded member is also a tube and, therefore, may receive the rotatable spindle. At an end closest to the drill bit, the internally threaded tube is advantageously sealed against the rotatable spindle in a manner that allows rotation of the spindle, but provides a further measure against the admission of chips and burrs into the internally threaded tube.

In accordance with another aspect of this invention, a drill rig is provided that comprises frame structure and a drill bit holding and advancing mechanism having cooperating threaded members and a rotatable spindle. As generally described above, the cooperating threaded members are operatively connected to the rotatable spindle to move the rotatable spindle along the drilling axis, but allow rotation of the spindle and attached drill bit. In accordance with this aspect of the invention, the drill bit holding and advancing mechanism is easily and quickly connectable to the frame structure by a connector that surrounds the drill bit holding and advancing mechanism. A locking mechanism is provided for locking the connection. Thus, in this aspect, the drill rig provides the benefits associated with threaded adjustability of drilling pressure and the benefits of quick and secure connection between the frame structure and the drill bit holding and advancing mechanism. In accordance with this aspect of the invention, a drill operator, such as a locksmith or other maintenance person, can relatively quickly produce one or more access holes within high security safes or secure containers, for example, while minimizing effort and fatigue. This is especially true in situations where many drill bits are broken or otherwise in need of replacement and/or several holes are necessary. In one preferred aspect of the invention generally related to this feature, a sliding connection is made between the drill bit holding and advancing mechanism and the frame structure.

Although the locking mechanism may take many forms while still realizing other benefits of the invention, the locking mechanism is advantageously a quick-release mechanism generally disposed between the frame structure and the drill bit holding and advancing mechanism. This quick-release locking mechanism may be moved between locked and unlocked positions by an easy pushing motion. Specifically, the locking mechanism advantageously includes a collar having a movable detent element. The collar is preferably spring-loaded to normally bias the detent element into a locked position. The detent element engages an outer surface of the internally threaded tube and a mounting portion of the frame structure in this locked position. An operator may easily move the locking collar against the spring bias to disengage the detent element from the locked position and allow the drill bit holding and advancing mechanism to be easily withdrawn from the frame structure and replaced, as necessary. Multiple detent receiving apertures or recesses may be provided along the drill bit holding and advancing mechanism, such as along the outer surface of the internally threaded tube. This allows adjustment in the axial placement of the drill bit holding and advancing mechanism with respect to both the frame structure and the hard or drill resistant material.

These and other objects and advantages of the invention, including the apparatus described above and corresponding methods of use, will become more readily apparent to those of ordinary skill in the art upon review of the following detailed description of one illustrative embodiment, taken in conjunction with the accompanying drawings.

DETAILED DESCRIPTION OF THE DRAWINGS

Figure 1:
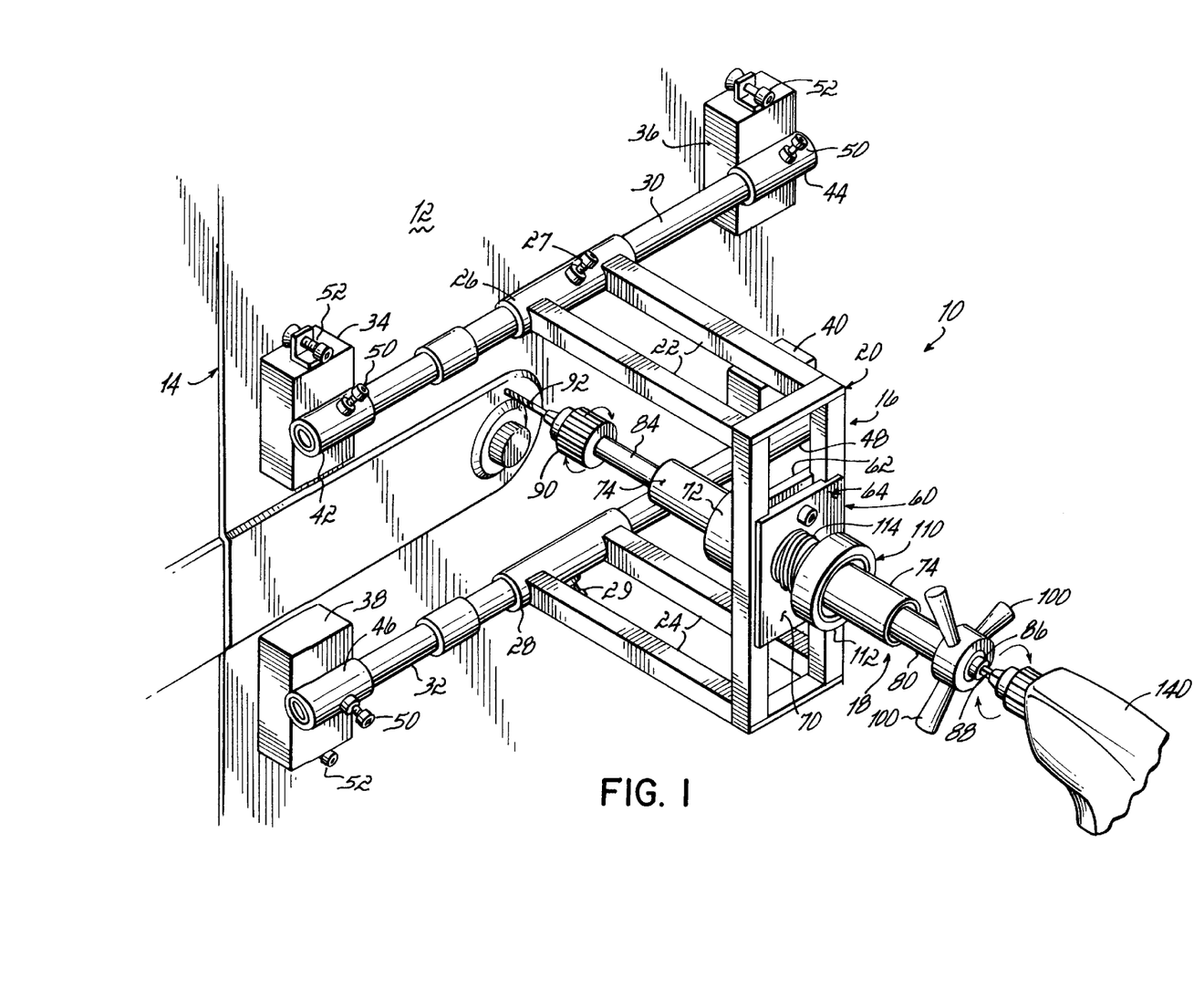
FIG. 1 is a perspective view of a drill rig, constructed in accordance with a specific embodiment of this invention, shown being used to form a hole in the door of a safe.

FIG. 1 illustrates a drill rig 10 constructed generally in accordance with one illustrative embodiment of this invention. Drill rig 10 is shown attached to a door 12 of a safe 14 for drilling an access hole. However, it will be appreciated that drill rig 10 may be used on any other wall of safe 14. Furthermore, drill rig 10 may be used on any other secure container or on any other structure constructed of a drill resistant material, such as a heavy gauge metal.

Drill rig 10 generally includes suitable frame structure 16 for attaching rig 10 to safe 14 and a drill bit holding and advancing mechanism 18 constructed in accordance with the principles of the invention. Frame structure 16 is shown only for illustrative purposes and it will appreciated that many different constructions and configurations, as well as safe attachment means, may be substituted for those shown in FIG. 1 depending on operator preferences or application needs. The specifically illustrated frame structure 16 is only one type generally utilized for heavier duty applications.

Specifically, frame structure 16 includes a cross support 20 for drill bit holding and advancing mechanism 18 and support legs 22, 24 for attaching drill bit holding and advancing mechanism 18 generally in spaced relation to safe 14. Tubular mounting members 26, 28 receive cross support members 30, 32 which may be fastened in place by set screws 27, 29. The ends of cross members 30, 32 are securely connected to respective magnets 34, 36, 38, 40 by being received in respective tubular mounting members 42, 44, 46, 48 rigidly secured to magnets 34, 36, 38, 40. Set screws 50 may also be used to make the connection between cross members 30, 32 and tubular mounting members 42, 44, 46, 48. As is conventional, threaded release members 52 may also be provided on each magnet. When these threaded release members 52 are moved against safe 14, magnets 34, 36, 38, 40 may be forced to disconnected from door 12. Although the strength of magnets 34, 36, 38, 40 may vary, a typical magnet for heavy duty applications may have a 450 lb. pull capacity. As mentioned above, other types of attachments may be used depending on the application needs or user preferences. These include straps, clamps, vacuum assisted devices or screw attachments directly to a safe or other structure.

Figure 2:
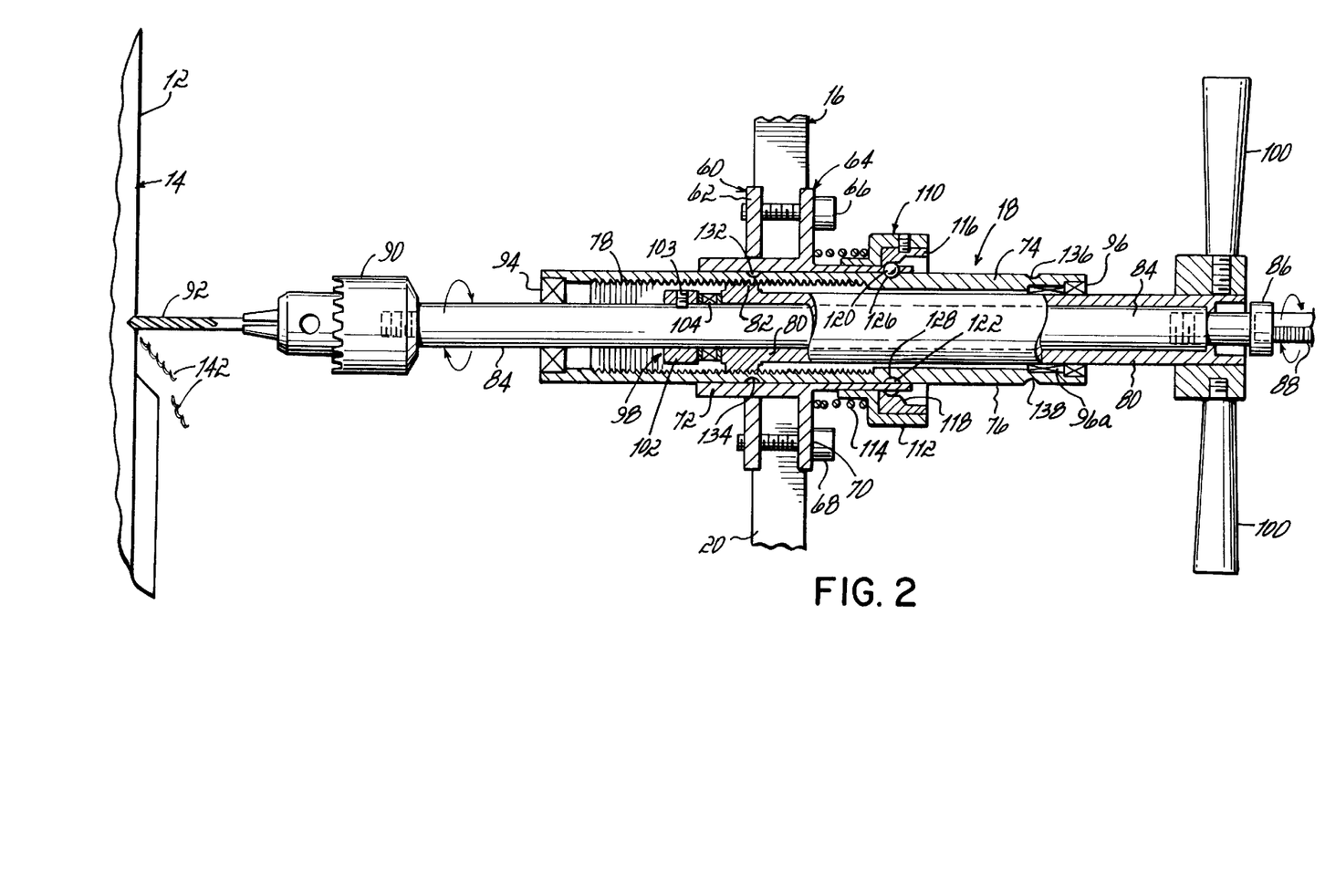
FIG. 2 is an axial cross-sectional view of the drill bit holding and advancing mechanism shown in FIG. 1.

As shown in both FIGS. 1 and 2, frame structure 16 includes a mounting portion 60 for drill bit holding and advancement mechanism 18. Mounting portion 60 specifically comprises mounting members 62, 64 which sandwich cross support 20 therebetween and are fastened by suitable fasteners, such as machine screws 66, 68. Mounting member 62 may simply comprise a plate, while mounting member 64 advantageously includes a flange connector portion 70 and a tubular portion 72 that receives drill bit holding and advancing mechanism 18 in a sliding manner. In this way, a sliding connection is formed between drill bit holding and advancing mechanism 18 and mounting portion 60. Other types of connections may be used in place of the one specifically shown herein.

As specifically shown in FIG. 2, drill bit holding and advancing mechanism 18 includes a first tube, more specifically formed as a cylinder, having an outer surface 76 for sliding within tubular mounting portion 72 and further including internal threads 78. A second tube 80 is received within first tube 74 and includes external threads 82 engaged with internal threads 78. A rotatable spindle 84 is received for rotation within second, externally threaded tube 80 and includes one end portion 86 for engaging a suitable driver 88 and an opposite end having a chuck 90 for receiving a drill bit 92. Chuck 90 may be any appropriate, conventional drill chuck or may be substituted with other drill bit holders. Respective seals and bearing elements 94, 96, 96a are provided at opposite ends of internally threaded tube 74. Element 94 serves as a bearing with respect to rotatable spindle 84, while seal and bearing elements 96, 96a bear against second, externally threaded tube 80 and allow rotation thereof relative to internally threaded tube 74. A connection 98 is formed between externally threaded tube 80 and rotatable spindle 84. Connection 98 allows relative rotation between externally threaded tube 80 and rotatable spindle 84, but forces rotatable spindle to move axially, i.e., in the direction of the drilling axis of drill bit 92, when externally threaded tube 80 is rotated by the operator. For facilitating rotation of tube 80, one or more handles 100 are affixed thereto, as shown in FIG. 2.

As further shown in FIG. 2, connection 98 may be formed by rigidly securing a collar 102 to rotatable spindle 84, such as by a pin 103. A thrust bearing 104 is connected between collar 102 and the end of externally threaded tube 80 in a manner that allows relative rotation between collar 102 and tube 80, but connects collar 102 and tube 80 together for axial movement. Therefore, it will be understood that when driver 88 is rotated, spindle 84 will also rotate and thereby rotate drill bit 92. When handles 100 are rotated to rotate externally threaded tube 80, this will push or pull rotatable spindle 84 along the drilling axis to either apply drilling pressure to safe door 12 or withdraw drill bit 92, depending on whether clockwise or counterclockwise rotation is applied to externally threaded tube 80.

Still referring to FIG. 2, a quick-release locking mechanism 110 for mounting and locking drill bit holding and advancing mechanism 18 to mounting portion 60 specifically comprises a collar 112 that may be operated by a user with a pushing motion to easily unlock drill bit holding and advancing mechanism 18 and allow withdrawal of drill bit holding and advancing mechanism 18 from mounting portion 60 of frame structure 16 (FIG. 1). In the illustrated embodiment a coil spring 114 is disposed between flange portion 70 of mounting member 64 and collar 112. Collar 112 includes an internal cam element 116 having a ramped surface 118 engaging a plurality of detent elements specifically shown as balls 120, 122, 124 (FIGS. 2, 5 and 5A) which generally surround and engage tubular mounting member portion 72 and internally threaded tube 74. Specifically, detent elements 120, 122, 124 engage respective recesses 126, 128, 130 (FIGS. 2, 5 and 5A) in the outside surface 76 of internally threaded tube 74. When locked in position, cam element 116 forces detent elements or balls 120, 122, 124 to remain securely within recesses 126, 128, 130 thereby locking internally threaded tube 74 to tubular mounting member portion 72. As tubular portion 72 is part of mounting portion 60 and, therefore, also part of stationary frame structure 16 in general, this locks drill bit holding and advancing mechanism 18 in place on frame structure 16. Additional sets of recesses for detent elements 120, 122, 124 may be disposed at selected locations along surface 76 of internally threaded tube 74. In this regard, recesses 132, 134, 136, 138 are illustrated in FIG. 2 and, at each location, represent two of three recesses provided to allow axial adjustment of drill bit holding and advancing mechanism 18 with respect to mounting portion 60 and safe 14.

OPERATION

Figure 4:
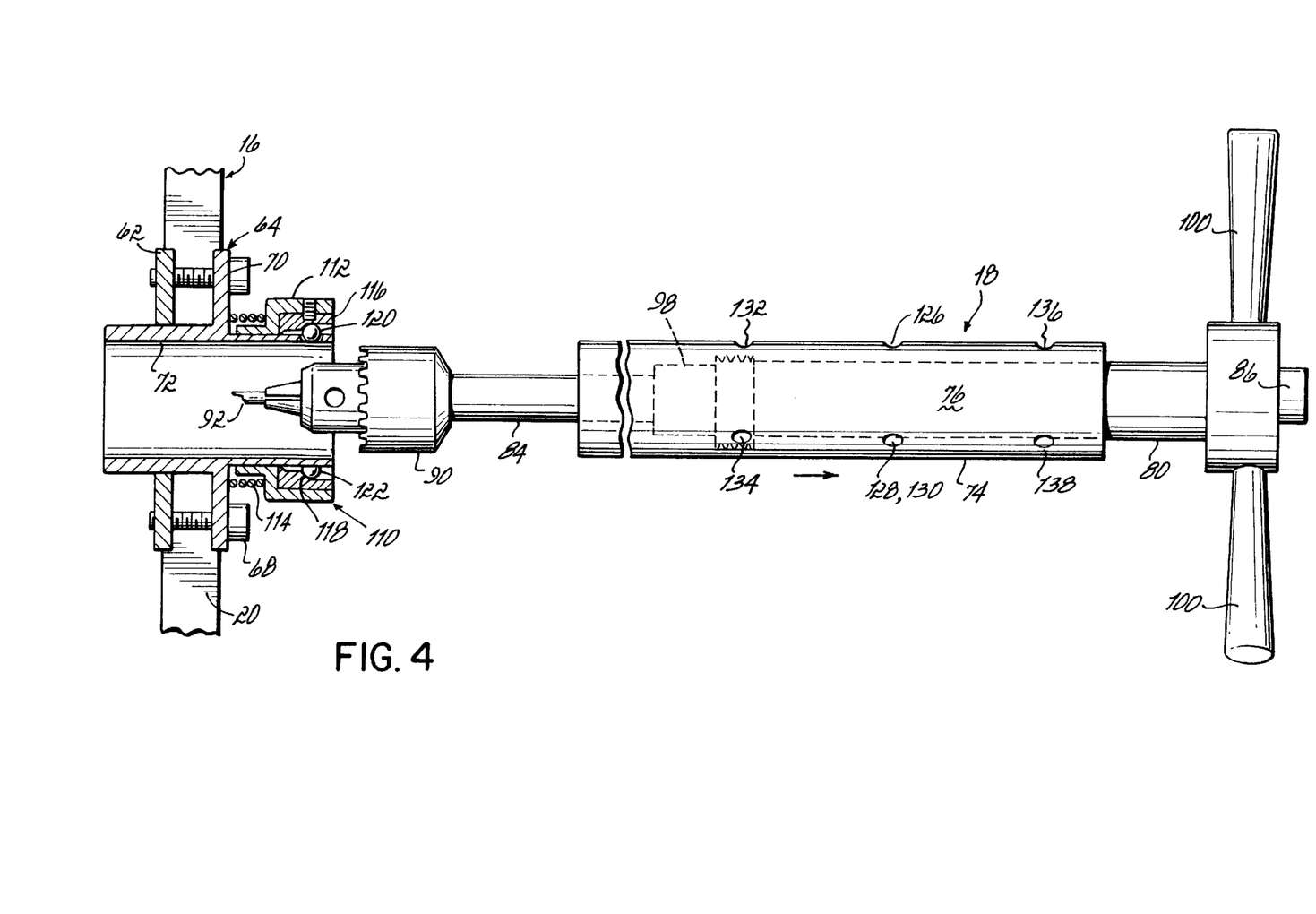
FIG. 4 is an exploded partial cross-sectional view of the drill bit holding and advancing mechanism being removed from the mounting portion of the associated frame structure.
Figure 5:
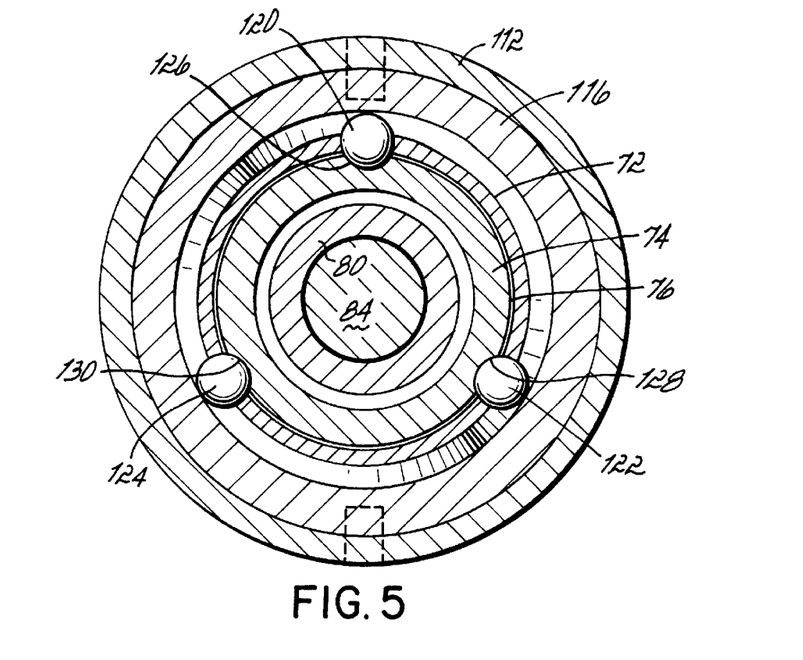
FIG. 5 is a cross sectional view of the drill bit holding and advancing mechanism and quick-release locking mechanism taken generally along line 5—5 of FIG. 3 and showing the quick-release locking mechanism in a locked position.
Figure 5A:
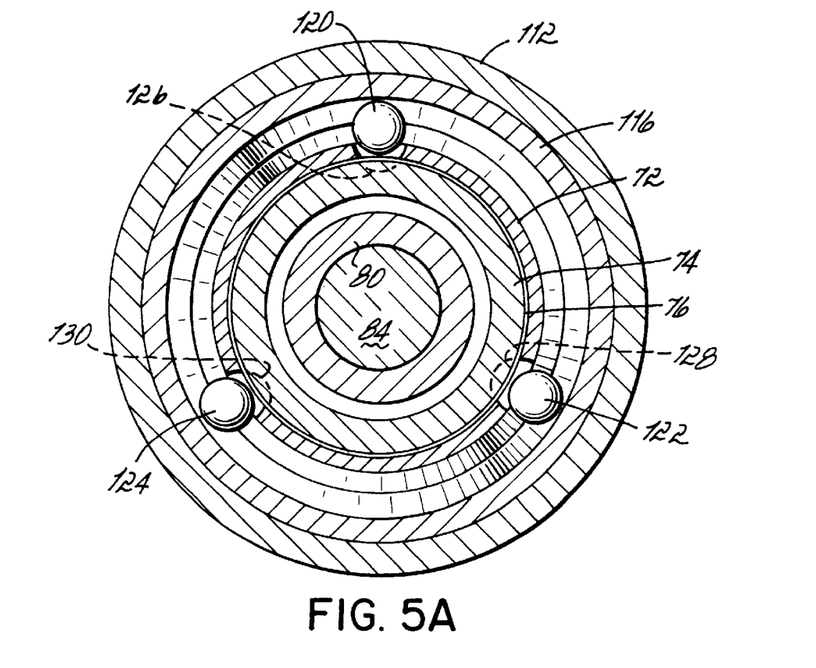
FIG. 5A is a cross sectional view similar to FIG. 5, but showing the quick-release locking mechanism in an unlocked position.

The operation of rig 10 will be described in connection with the specific application shown in the drawings with the understanding that the described process may be adapted to many other applications within the scope of the inventive concepts. Referring first to FIG. 1, in order to drill an access hole in door 12 of safe 14, frame structure 16 is attached to door 12, as shown, in a generally conventional manner. With drill bit holding and advancing mechanism 18 preferably removed from frame structure 16, a drill bit 92 may be secured within chuck 90. As best shown in FIG. 4, collar 112 is then pushed toward mounting portion 60 of frame structure 16 to compress spring 114. This allows detent elements or balls 120, 122, 124 to move away from internally threaded tube 74, as shown in FIG. 4 and FIG. 5A. With the collar depressed, drill bit holding and advancing mechanism 18, and specifically internally threaded tube 74 may slide freely within tubular mounting portion 72. After insertion of tube 74 within mounting portion 60, collar 112 may be released allowing ramped surface 118 to force detent elements or balls 120, 122, 124 toward the outer surface 76 of internally threaded tube 74. When detent elements or balls 120, 122, 124 line up with the corresponding and desired set of recesses 126, 128, 130, detent elements or balls 120, 122, 124 will be forced into recesses 126, 128, 130 through further urging by cam element 116 under the force of spring 114. In the locked position under the normal bias of spring 114, cam element 116 will maintain detent elements or balls 120, 122, 124 within recesses 126, 128, 130 as shown in FIGS. 2 and 5.

Figure 3:
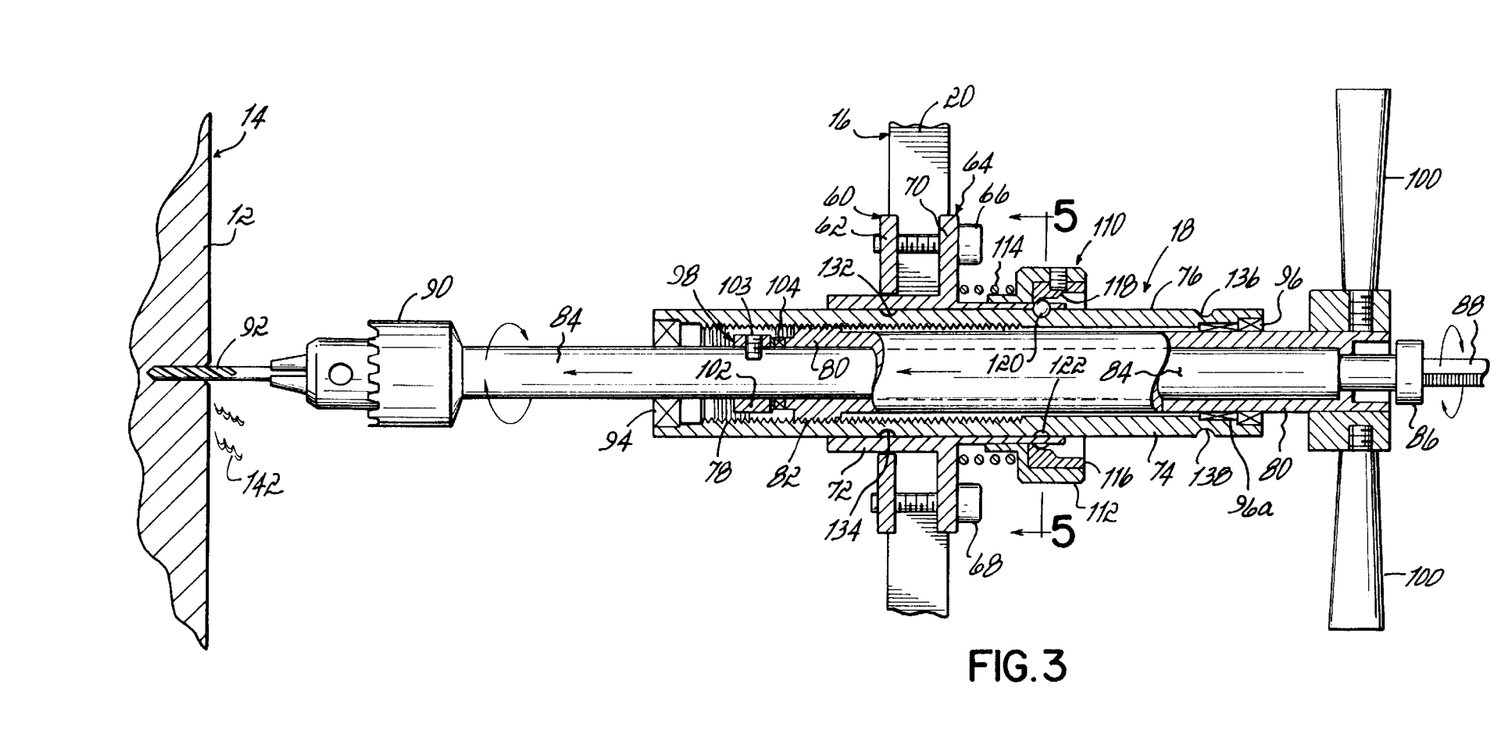
FIG. 3 is a cross-sectional view similar to FIG. 2, but showing further advancement of the drill bit into the door of a safe.

Once drill rig 10 and drill bit holding and advancing mechanism 18 are locked in position as shown in FIGS. 1 and 2, handles 100 may first be rotated in a clockwise direction, as shown in FIG. 1 to axially move rotatable spindle 84 and the attached drill bit 92 closely proximate to the desired location on safe door 12. A drill 140 (FIG. 1) having an appropriate driver 88 may be applied to end portion 86 of rotatable spindle 84. Drill 140 may then be operated as shown in FIG. 2 and handles 100 may be incrementally rotated, as shown in FIG. 3, to drill a hole. During this drilling operation, it will be appreciated from a review of FIGS. 2 and 3 that the enclosed or shielded threads 78, 82 will not be susceptible to burrs and chips 142 thrown off from the drilling operation. Drill bit 92 may be withdrawn from the hole by rotating handles 100 in a counterclockwise direction as viewed in FIG. 1. At the end of a drilling operation, or in the event that a drill bit 92 breaks (as shown in FIG. 4) or is otherwise in need of replacement, collar 112 may be simply pushed against mounting portion 60 to unlock drill bit holding and advancing mechanism 18 and allow the operator to slide drill bit holding and advancing mechanism 18 out of mounting portion 60. It will be appreciated that unlocking of detent elements or balls 120, 122, 124 takes place in a reverse manner to the described locking process.

While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. For example, the various aspects and features of this invention may be used in either a combined fashion or a singular fashion in a drill rig suitable for many different drilling requirements, depending on user preferences or the needs of particular applications. The invention in its broader aspects is therefore not limited to the specific details, representative apparatus and method as shown and described.

The invention itself should only be defined by the appended claims, wherein we claim:

1. A drill rig for drilling a hole in hard or drill resistant material, the drill rig comprising:

frame structure adapted to be securely attached adjacent to the hard or drill resistant material;

a drill bit holding and advancing mechanism mounted to the frame structure and having a rotatable spindle for holding a drill bit along a drilling axis, the drill bit holding and advancing mechanism further including enclosed, cooperating threaded members operatively connected with the spindle to advance the spindle incrementally along the drilling axis, said spindle having a tool engaging end portion aligned along the drilling axis for engaging a tool adapted to rotate the spindle; and a handle coupled with one of the threaded members and rotatable about the drilling axis to advance the spindle incrementally along the drilling axis.

2. The drill rig of claim 1, wherein the enclosed, cooperating threaded members include an internally threaded tube connected to the frame structure and an externally threaded member received by the internally threaded tube.

3. The drill rig of claim 2 further including a handle connected to the externally threaded member for allowing rotation of the externally threaded member by a user.

4. A drill rig for drilling a hole in hard or drill resistant material, the drill rig comprising:

frame structure adapted to be securely attached adjacent to the hard or drill resistant material;

a drill bit holding and advancing mechanism mounted to the frame structure and having a rotatable spindle for holding a drill bit along a drilling axis, the drill bit holding and advancing mechanism further including enclosed, cooperating threaded members comprised of an internally threaded tube connected to the frame structure and an externally threaded member received by the internally threaded tube, said threaded members operatively connected with the spindle to advance the spindle incrementally along the drilling axis; and a handle connected to the externally threaded member for allowing rotation of the externally threaded member by a user;

wherein said externally threaded member is connected for axial movement with the rotatable spindle and to allow relative rotation therebetween.

5. The drill rig of claim 4, wherein the externally threaded member is a tube that receives the rotatable spindle.

6. The drill rig of claim 2, wherein the internally threaded tube is sealed to the rotatable spindle at least at an end of the internally threaded tube facing toward the drill bit during operation.

7. A drill rig for drilling a hole in hard or drill resistant material, the drill rig comprising:

frame structure adapted to be securely attached adjacent to the hard or drill resistant material; and a drill bit holding and advancing mechanism mounted to the frame structure and having a rotatable spindle for holding a drill bit along a drilling axis, the drill bit holding and advancing mechanism further including enclosed, cooperating threaded members operatively connected with the spindle to advance the spindle incrementally along the drilling axis;

wherein the drill bit holding and advancing mechanism is mounted to the frame structure in a sliding manner with a quick-release locking mechanism generally disposed therebetween for selectively locking the drill bit holding and advancing mechanism to the frame structure.

8. The drill rig of claim 7, wherein the quick-release locking mechanism includes a collar having a detent element movable between locked and unlocked positions by the user.

9. The drill rig of claim 8, wherein the detent element engages one of the threaded members to lock the drill bit holding and advancing mechanism to the frame structure.

10. The drill rig of claim 7, wherein the quick-release locking mechanism further includes a spring-loaded locking member.

11. The drill rig of claim 10, wherein the spring-loaded locking member is normally spring-biased into a locking position.

12. A drill rig for drilling a hole in hard or drill resistant material, the drill rig comprising:

frame structure adapted to be securely attached adjacent to the hard or drill resistant material;

a drill bit holding and advancing mechanism mounted to the frame structure with a sliding connection, the drill bit holding and advancing mechanism including a rotatable spindle for holding a drill bit along a drilling axis, and further including cooperating threaded members operatively connected with the rotatable spindle to move the rotatable spindle incrementally along the drilling axis; and a locking mechanism for locking the sliding connection between the drill bit holding and advancing mechanism and the frame structure.

13. The drill rig of claim 12, wherein the locking mechanism is a spring-loaded, quick-release locking mechanism.

14. The drill rig of claim 13, wherein the quick-release locking mechanism includes a collar having a detent element movable between locked and unlocked positions by a user.

15. The drill rig of claim 14, wherein the detent element engages one of the threaded members to lock the drill bit holding and advancing mechanism to the frame structure.

16. The drill rig of claim 13, wherein the spring-loaded, quick-release locking mechanism is normally spring-biased into a locked position.

17. A drill rig for drilling a hole in hard or drill resistant material, the drill rig comprising:

frame structure adapted to be attached adjacent to the hard or drill resistant material;

a drill bit holding and advancing mechanism removably mounted to the frame structure, the drill bit holding and advancing mechanism including a rotatable spindle for holding a drill bit along a drilling axis, the drill bit holding and advancing mechanism further including an outer tube having internal threads and an inner member having external threads engaged with said internal threads, the inner member being operatively connected with the rotatable spindle to move the rotatable spindle incrementally along the drilling axis; and a locking mechanism for selectively locking the drill bit holding and advancing mechanism to the frame structure.

18. The drill rig of claim 17, wherein the locking mechanism is a spring-loaded, quick-release locking mechanism.

19. The drill rig of claim 18, wherein the quick-release locking mechanism includes a collar having a detent element movable between locked and unlocked positions by the user.

20. The drill rig of claim 19, wherein the detent element engages the outer tube to lock the drill bit holding and advancing mechanism to the frame structure.

21. The drill rig of claim 20 wherein a plurality of sets of recesses are provided on the outside surface of the outer tube to selectively engage a set of said detent elements thereby providing axial adjustability of the drill bit holding and advancing mechanism with respect to said frame structure.

22. The drill rig of claim 18, wherein the spring-loaded, quick-release locking mechanism is normally spring-biased into a locking position.

23. The drill rig of claim 17, wherein the inner member is a tube receiving the spindle for relative rotation therein.

24. A method of drilling a hole in a hard or drill resistant material using a drill rig, the method comprising the steps of:
  a) attaching frame structure of the drill rig to the material;
  b) attaching a drill bit to a rotatable spindle connected with a drill bit holding and advancing mechanism;
  c) sliding the drill bit holding and advancing mechanism into the frame structure;
  d) locking the drill bit holding and advancing mechanism to the frame structure;
  e) engaging the drill bit holding and advancing mechanism with a driver to rotate the drill bit; and
  f) rotating a threaded portion of the drill bit holding and advancing mechanism while rotating the driver to drill the hole.

25. In a drill rig for drilling a hole in hard or drill resistant material, the drill rig including a drill bit holding and advancing mechanism connected to frame structure, the drill bit holding and advancing mechanism including a spindle for holding a drill bit and a pair of threaded members for incrementally advancing the drill bit into a hole as said spindle is rotating, the improvement comprising:

a sliding connection made between the drill bit holding and advancing mechanism and the frame structure, the sliding connection including a locking element for fixing the drill bit holding and advancing mechanism relative to the frame structure.

26. A drill rig for drilling a hole in hard or drill resistant material, the drill rig comprising:
  frame structure adapted to be securely attached adjacent to the hard or drill resistant material;
  a drill bit holding and advancing mechanism mounted to the frame structure with a mounting member that surrounds the drill bit holding and advancing mechanism, the drill bit holding and advancing mechanism having a rotatable spindle for holding a drill bit along a drilling axis, and further including cooperating threaded members operatively connected with the rotatable spindle to move the rotatable spindle incrementally along the drilling axis; and
  a locking mechanism for selectively locking the mounting member to the frame structure.

27. The drill rig of claim 26, wherein the mounting member further comprises one of the threaded members in the form of an internally threaded tube.

28. The drill rig of claim 27, wherein the locking mechanism engages an outer surface of the internally threaded tube.

29. The drill rig of claim 28, wherein the outer surface of the internally threaded tube has a sliding connection with the frame structure.

30. The drill rig of claim 29, wherein the locking mechanism is a detent.

31. The method of claim 24, wherein the method is performed on a secure container having a combination lock.

32. The method of claim 24 further comprising the step of:
  shielding the threaded portion from burrs and chips produced while drilling the access hole.

* * * * *